(12) United States Patent
Ito et al.

(10) Patent No.: US 8,041,685 B2
(45) Date of Patent: Oct. 18, 2011

(54) METHOD OF CHANGING SYSTEM CONFIGURATION IN SHARED-NOTHING DATABASE MANAGEMENT SYSTEM

(75) Inventors: Daisuke Ito, Kokubunji (JP); Kazutomo Ushijima, Kokubunji (JP); Frederico Buchholz Maciel, Kokubunji (JP); Shinji Fujiwara, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 904 days.

(21) Appl. No.: 12/071,827

(22) Filed: Feb. 27, 2008

(65) Prior Publication Data

US 2008/0163237 A1 Jul. 3, 2008

Related U.S. Application Data

(63) Continuation of application No. 10/835,073, filed on Apr. 30, 2004, now Pat. No. 7,370,029.

(30) Foreign Application Priority Data

Jan. 9, 2004 (JP) .................................. 2004-003601

(51) Int. Cl.
*G06F 17/30* (2006.01)
(52) U.S. Cl. ......................................... 707/678; 707/679
(58) Field of Classification Search .......... 707/634–641, 707/644–660, 670–682, 751–758
See application file for complete search history.

(56) References Cited

U.S. PATENT DOCUMENTS

| | | | | |
|---|---|---|---|---|
| 5,675,791 A | 10/1997 | Bhide et al. | ............... | 707/999.08 |
| 5,806,059 A | 9/1998 | Tsuchida et al. | ......... | 707/999.02 |
| 5,842,207 A | 11/1998 | Fujiwara et al. | ......... | 707/999.07 |
| 5,845,113 A | 12/1998 | Swami et al. | ............ | 707/999.07 |
| 5,860,137 A | 1/1999 | Raz et al. | ...................... | 711/202 |
| 6,173,306 B1 | 1/2001 | Raz et al. | ...................... | 718/102 |
| 6,341,340 B1 | 1/2002 | Tsukerman et al. | .......... | 711/150 |
| 6,377,991 B1 | 4/2002 | Smith et al. | .................... | 709/226 |
| 6,510,428 B2 | 1/2003 | Tsuchida et al. | ......... | 707/999.02 |
| 6,778,977 B1 | 8/2004 | Avadhanam et al. | ......... | 707/737 |
| 2002/0069282 A1 | 6/2002 | Reisman | ....................... | 709/227 |
| 2002/0080181 A1 | 6/2002 | Razdow et al. | ............... | 715/772 |
| 2002/0129094 A1 | 9/2002 | Reisman | ....................... | 709/203 |

(Continued)

FOREIGN PATENT DOCUMENTS

| | | |
|---|---|---|
| JP | 9218858 A | 8/1997 |
| JP | 11-282734 | 10/1999 |
| JP | 2003067351 A | 3/2003 |
| JP | 2003296153 A | 10/2003 |

OTHER PUBLICATIONS

IBM DB2 Universal Database—[Administration Guide: Performance, Ver. 7], Online Manual "Manager's Handbook," Chapter 30, bundled with DB2, version 7.2., May 18, 2001. Notification of Reasons for Refusal, dated Apr. 21, 2009, issued in corresponding Japanese Patent Application No. 2004-003601 along with English language translation.

Japanese Office Action, dated Sep. 8, 2009, issued in corresponding Japanese Patent Application No. 2004-003601.

*Primary Examiner* — Wilson Lee
(74) *Attorney, Agent, or Firm* — Brundidge & Stanger, P.C.

(57) ABSTRACT

A shared-nothing database management system employs a method of adding and removing a database server without significantly affecting the processing performance for accessing a table from a user or an application. A scheduler module creates a schedule which separately handles the addition of a CPU resource and the addition of a storage I/O resource, and a server is added in accordance with the created schedule. A common disk is used to remove a disk at an arbitrary timing. Further, a data region is previously subdivided on the common disk to eliminate a movement of data associated with the addition of a server.

11 Claims, 13 Drawing Sheets

U.S. PATENT DOCUMENTS

| | | | |
|---|---|---|---|
| 2003/0158862 A1* | 8/2003 | Eshel et al. | 707/200 |
| 2004/0102200 A1* | 5/2004 | Palkisto et al. | 455/466 |
| 2004/0162930 A1* | 8/2004 | Forin et al. | 711/1 |
| 2005/0027719 A1 | 2/2005 | Miciel et al. | 707/999.1 |
| 2005/0114623 A1* | 5/2005 | Craddock et al. | 711/200 |
| 2005/0222979 A1* | 10/2005 | Wu et al. | 707/3 |
| 2007/0101036 A1* | 5/2007 | Son et al. | 710/301 |

* cited by examiner

FIG. 7

HASH VALUE/MODULE ID CORRESPONDENCE TABLE 71

| HASH VALUE | BACK END MODULE ID |
|---|---|
| 1 | Module 1 |
| 2 | Module 1 |
| 3 | Module 1 |
| 4 | Module 2 |
| ⋮ | ⋮ |

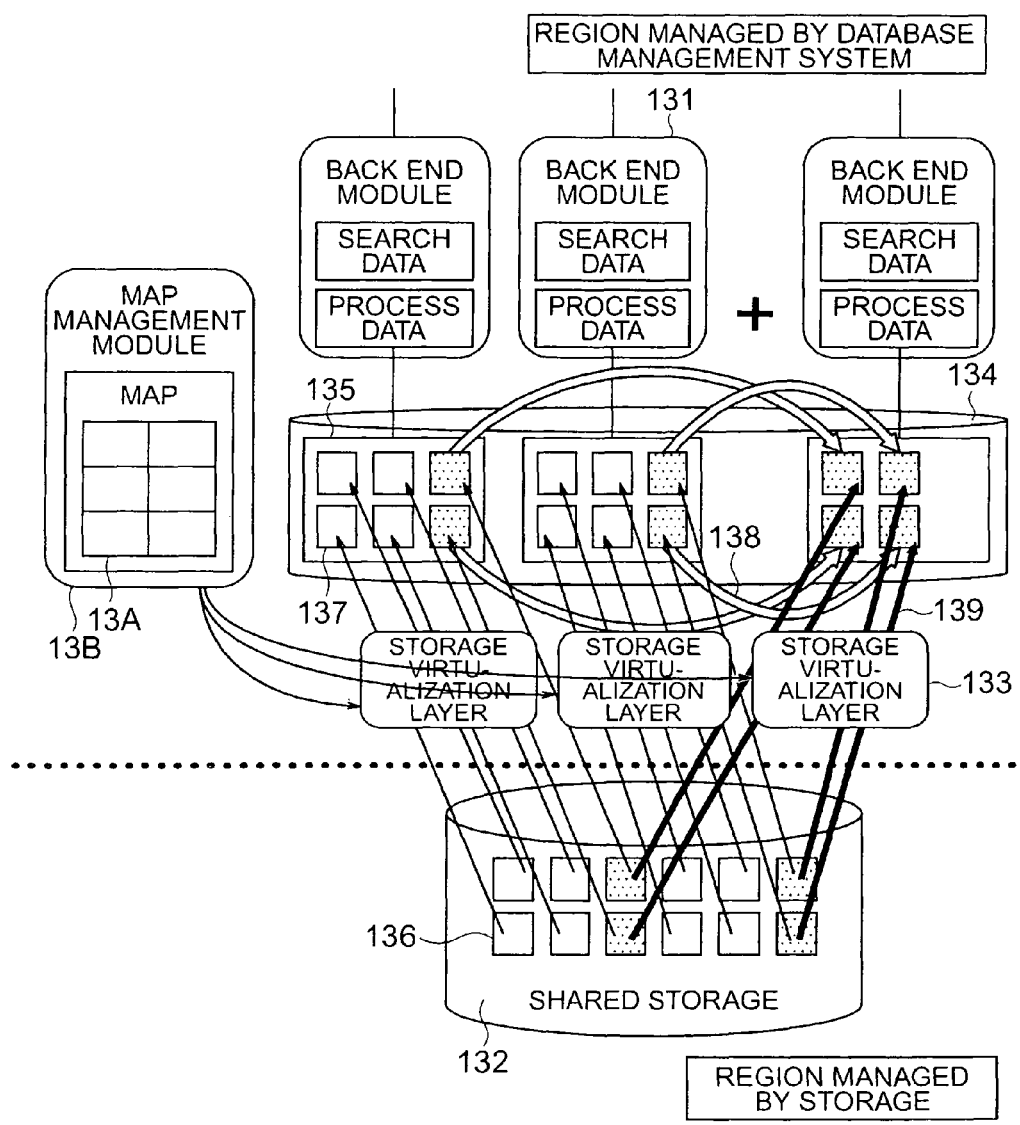

METHOD OF CHANGING SYSTEM CONFIGURATION IN SHARED-NOTHING DATABASE MANAGEMENT SYSTEM

INCORPORATION BY REFERENCE

The present application is a continuation to U.S. patent application Ser. No. 10/835,073, filed Apr. 30, 2004, now U.S. Pat. No. 7,370,029, which claims priority from Japanese application JP 2004-003601 filed on Jan. 9, 2004, the contents of which are hereby incorporated by reference.

BACKGROUND OF THE INVENTION

The present invention relates to a shared-nothing database management system which includes database servers that do not share data to be processed, and more particularly, to a database configuration management program which automatically changes the system configuration in accordance with a loading condition on the system.

<Description of Background, and Definition of Terms>

A shared-nothing database management system is one of configurations designed for building a large-scaled database system which is made up of a plurality of database servers.

In the shared-nothing database management system, a processor, a memory and a storage, which are main components of a computer, are assigned to each database server, so that the database servers do not share system components except for a network. Data which builds a database is also distributed to each database server, and is stored in a storage assigned thereto. Thus, each database server is responsible for processing a relatively prime subset of the database, and processes the data subset by subset.

From the features of the configuration as described above, the shared-nothing database management system has the advantage of the elimination of the need for exclusive control processing for shared resources, and a high scalability for an increase in the number of database servers.

However, if imbalances occur in the amounts of data handled by the respective database servers due to such a cause as a modification in the system configuration, a database server having a larger amount of data takes a relatively longer time for execution, thereby failing to efficiently process overall queries. For this reason, the shared-nothing database system is disadvantageously obliged to change the allocation of data to the servers as well, when the number of database servers is changed, in order to maintain the balance of data handled by the respective database servers.

[Resources of Database Server]

For adding a new database server to a shared-nothing database management system, a new server machine is generally added, and a database server is run on the new server machine. The addition of the new server machine results in increased resources for running the database server, and a resulting improvement in performance. In the present invention, among the foregoing resources, one associated with the improvement in processing performance is referred to as a "CPU resource." Also, a resource associated with the improvement in storage input/output performance is referred to as a "storage I/O resource."

[Data Relocation]

As described above, data must be balanced among the database servers when a database server is additionally installed in the shared-nothing database management system, or when a database server is removed from the shared-nothing database management system. In the present invention, this operation is hereinafter referred to as "relocation of data."

[Virtualization of Storage]

Virtualization of storage is one of means for improving the usability of storages on a network. When a plurality of storages residing on a network are used from a single server, the operational management can be unified to reduce the management cost by making the storages appear as if the server were using a single storage.

In the present invention, a location in which the virtualization of storage is implemented is referred to as a "(storage) virtualization layer." The storage virtualization layer may generally reside on a storage, a storage management middleware, or a file system.

The operating system manages the storages on a volume-unit basis. Therefore, in the present invention, a virtualized storage is referred to as a "logical volume." On the other hand, each storage which forms part of a logical volume is referred to as a "unit volume."

<Description of Conventional Approach>

A conventional approach employs ALTER NODEGROUP statement described in Online Manual "Manager's Handbook," Chapter 30, bundled with DB2, Version 7.2. As illustrated in FIG. 2A, for adding a new database server using this approach, a data region is added to a storage which is allocated to the new database server (21), the new database server is added to a shared-nothing database management system comprised of a plurality of database servers (22), and then data is relocated among the database servers in order to balance the amount of data (23). On the other hand, for removing a database server, data is relocated to empty a data region allocated to a database server to be removed (24), and then the database server is removed (25), as illustrated in FIG. 2B.

JP-A-11-282734 describes a parallel database management system which may be regarded as another conventional approach. This method changes the correspondence of a database to a database processing unit without interrupting an online service, thereby permitting a particular database processing unit to directly access a database managed by a plurality of database processing units. This method is also characterized in that the database is divided into a consistent number of subsets.

The foregoing conventional approaches fail to take into consideration frequent addition and removal of database servers in a shared-nothing database management system, and cannot add or remove a database server unless time-consuming data relocation is performed. Further, the data relocation, which is a heavy load processing, will result in degraded processing performance in accessing a table from a user or an application. Thus, when such an approach is applied to a system which can change the number of servers in accordance with loading, the addition of a server is not reflected to an improvement in processing performance without causing a delay, but rather can be a factor of causing a degradation in processing performance. Also, since data is relocated after removal of a server has been determined, there is a delay until the server can be actually removed.

Also, in a method described in JP-A-11-282734, for correcting a load distribution by reconfiguring the correspondence between a database and database processing units, the database divided into a consistent number of subsets makes it difficult to balance the loading among the database processing units. This method can balance the loading by previously dividing database into many small fragments, in which case, however, a large amount of database subsets will be created, thereby increasing the cost associated with the operational management such as vacuum, backup, and the like.

SUMMARY OF THE INVENTION

It is therefore an object of the present invention to provide a method of adding and/or removing a database server which affects less the processing performance for accessing a table from a user or an application.

The present invention includes a method of adding a CPU resource and a storage I/O resource to a shared-nothing database management system comprised of a plurality of database servers. This method includes the steps of adding to the shared-nothing database management system a server for exclusively sorting and merging data without performing processing involved in an access to a table in a database, determining whether or not a storage I/O resource is added, converting the server for exclusively sorting and merging data to a normal server for accessing a table in a database when determining that a storage I/O resource is added, and relocating data when the database server is lightly loaded.

Conversely, when a database server which has been operated is removed from the shared-nothing database management system, a system changing method is employed. This method includes the steps of monitoring the state of a CPU resource functioning as the database server to determine removal from the shared-nothing database management system, removing a database server determined to be removed without delay, and delegating a data region previously allocated to the database server to another database server, relocating data on the delegated storage region to another storage region, and removing the delegated storage region from which actual data has been deleted.

Also, a system configuration changing method according to another representative embodiment of the present invention includes the steps of setting a correspondence table indicative of a correspondence of respective data regions subdivided on the storage to database servers responsible for processing to determine the allocation of a plurality of data regions to the respective database servers, respectively, determining addition or removal of a database server, and rewriting part of the correspondence table to determine allocation of new data to be processed by a plurality of database servers after the addition or removal.

The present invention also includes a method of replacing a movement of data between a plurality of database servers with an update of a virtualization layer on a virtual file system. This method includes, as preoperative stages, the steps of:
 1. querying the virtual file system the capacity of a unit volume;
 2. upon creation of a table, creating a data group which is a minimum unit in a movement when data should be moved at a later time; and
 3. placing the data group in (2) in the unit volumes in (1) without overlapping.

The foregoing method also includes the following steps for making an actual movement:
 1. calculating and determining a destination for each data group on a database server;
 2. finding a unit volume corresponding to each data group on a database server;
 3. communicating the destination of each unit volume from the database server to the virtual file system; and
 4. replacing a movement of a unit volume with an update of a virtual layer on the virtual file system.

The present invention further includes an apparatus for replacing a movement of data between a plurality of database servers with an update of a virtualization layer on a virtual file system. The apparatus includes:
 1. a storage shared on a network;
 2. a data group which defines a minimum unit of movement in the event of a data movement;
 3. a virtual file system having a storage virtualization layer.

The storage in item 1 has the following mechanism:
 1. an interface for notifying the file system of the capacity of the unit volume.

Further, the virtual file system in item 3 has the following mechanism:
 2. an interface for notifying the database servers of the capacity of the unit volume.

The present invention also includes a method of replacing a movement of data between a plurality of database servers with an update of a virtualization layer on a database server. This method includes, as preparatory stages, the steps of:
 1. upon creation of a table, creating a data group which is a minimum unit in a movement when data should be moved at a later time; and
 2. placing the data group in the unit volumes without overlapping.

The method also includes the following steps for making an actual movement:
 1. calculating and determining a destination for each data group on a database server;
 2. finding a unit volume corresponding to each data group on a database server; and
 3. replacing a movement of a unit volume with an update of a virtual layer on the database server.

The present invention further includes an apparatus for replacing a movement of data between a plurality of database servers with an update of a virtualization layer on a virtual file server. The apparatus includes:
 1. a storage shared on a network;
 2. a data group which defines a minimum unit of movement in the event of a data movement;
 3. a database having a storage virtualization layer The storage in item 1 further has the following mechanism:
 1. an interface for notifying the database servers of the capacity of the unit volume.

According to the present invention, the data allocation associated with the addition or removal of a database server resource in a shared-nothing database management system is shifted to a period in which the system is lightly loaded to avoid an increase in load on database servers associated with the addition or removal, so that the shared-nothing database management system can advantageously set a high threshold for a load upon determination as to whether a server is added or removed in accordance with a load on the database servers, improve the availability ratio of the servers, and reduce the number of pooled servers.

Further, with a combination of a storage virtualization layer, a movement of data can be replaced with an update of virtual volumes to accomplish a data relocation without physical data movement, thereby further improving the availability ratio of the server.

With the employment of an approach which previously subdivides a data area on a common disk, a CPU resource and a storage I/O resource can be added and removed without causing a delay. Also, since no extra load such as data relocation is involved in the addition and removal of a resource, the shared-nothing database management system can advantageously set a high threshold for a load upon determination as to whether a server is added or removed in accordance with a load on the database servers, improve the availability ratio of the servers, and reduce the number of pooled servers, as is the case with the foregoing.

Other objects, features and advantages of the invention will become apparent from the following description of the embodiments of the invention taken in conjunction with the accompanying drawings.

BRIEF DESCRIPTION OF THE DRAWINGS

FIG. 7 shows a data structure in a hash-module ID correspondence table in the foregoing embodiment;

FIG. 13 is a block diagram illustrating the configuration of a shared-nothing database management system according to a further embodiment of the present invention which employs a virtualization layer on a database management system.

DETAILED DESCRIPTION OF THE EMBODIMENTS

Figure 1:
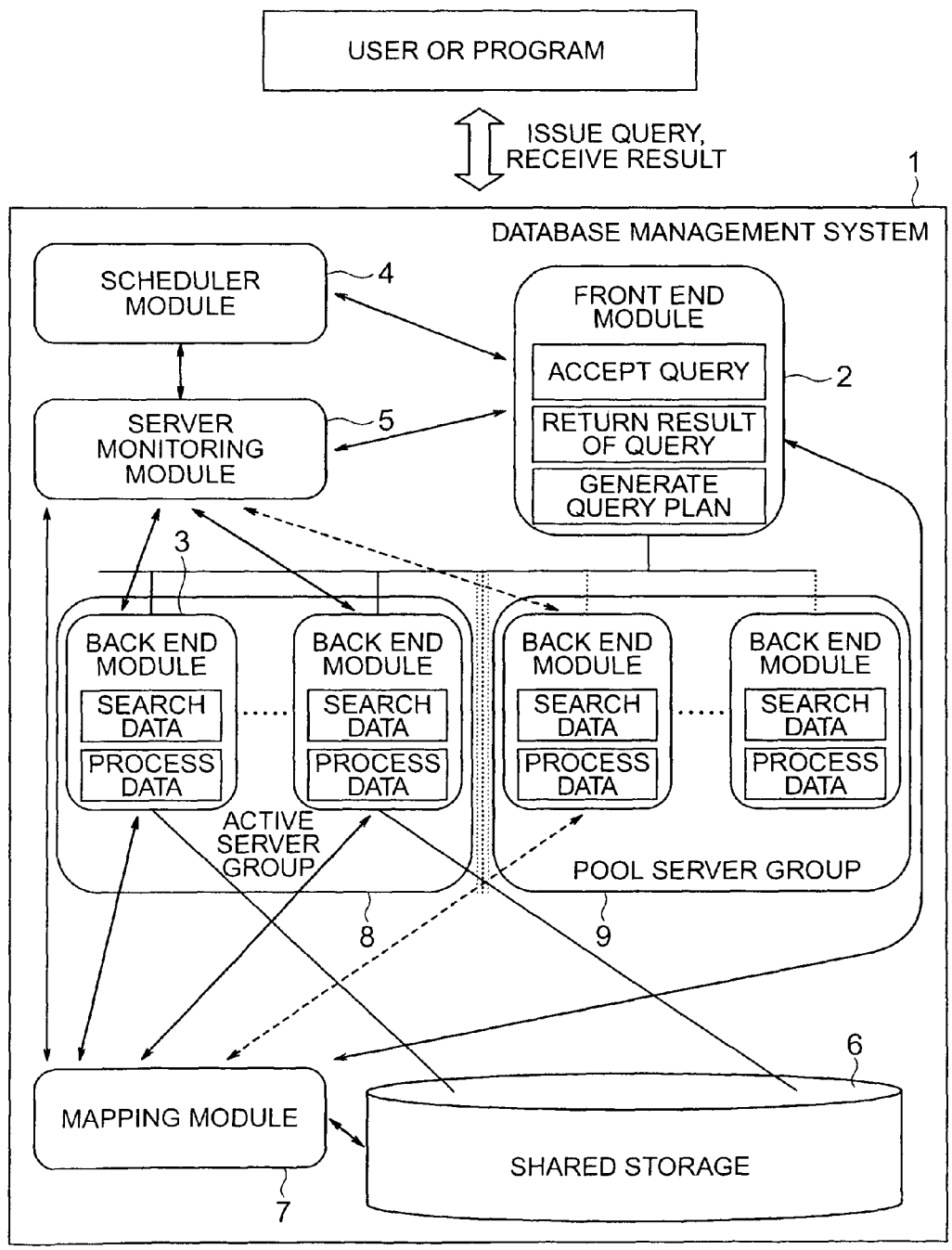
FIG. 1 is a block diagram generally illustrating the configuration of a shared-nothing database management system according to one embodiment of the present invention.
Figure 2A:
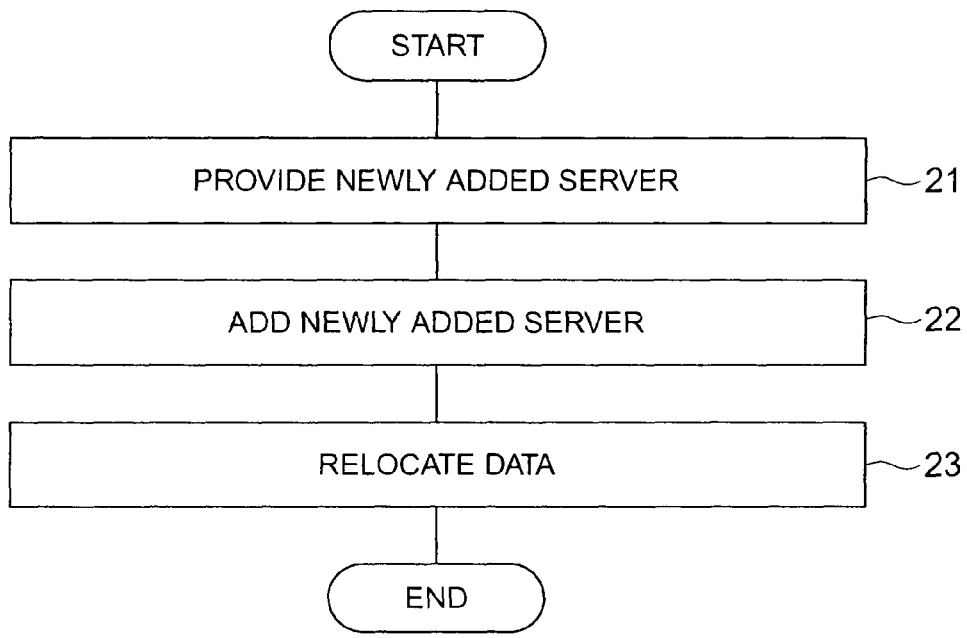
FIGS. 2A and 2B are flow charts illustrating a database server addition process and a database server removal process according to a conventional approach, respectively.
Figure 2B:
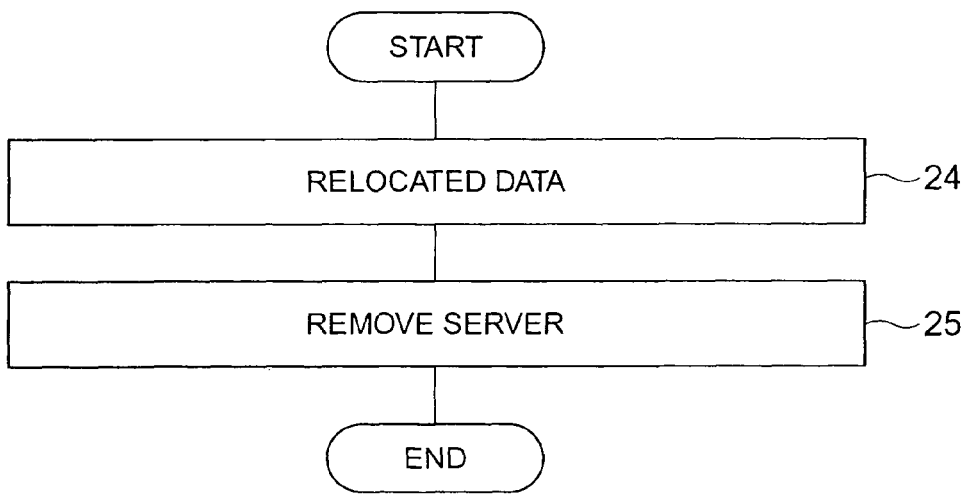

In the following, one embodiment of the present invention will be described with reference to FIG. 1.

A shared-nothing database management system (1) in this embodiment comprises a front end module (2) which mainly serves as a user interface; back end modules (3) each for searching and processing data; a scheduler module (4) for creating a schedule for adding and removing a database server; a server monitoring module (5) for monitoring database servers for loading; a common storage (6) shared among a plurality of back end modules; and a mapping module (7) for managing the mapping between the back end modules and the common storage.

The back end modules are logically classified into an active server group (8) and a pool server group (9) for management. The front end module (2) accepts a query from the user or a program, creates a plan in accordance with the query for a plurality of database servers, and returns the result. In this embodiment, since the active server group is dynamically changed in configuration, the front end module has a function of issuing a query conforming to the configuration of the active server group, corresponding to the dynamic change.

The back end module (3), which runs on the database server, searches an associated storage for data, and processes the resulting data. In this embodiment, one back end module is activated per server. The structure of the back end module will be described later in detail. The scheduler module (4) creates a schedule for adding and removing a database server. In accordance with the schedule created by the scheduler module, the server monitoring module sends an instruction to the back end modules.

The server monitoring module (5) monitors each database server for CPU loading, and coordinates the addition and removal of a database server. The allocation of storage resources to the database servers is devolved to the mapping module.

The common storage (6) is logically installed on a storage dedicated network. Since a dedicated data region is reserved for each back end module on the common storage, there is no contention for resources among the respective back end modules.

The mapping module (7) receives a request from the server monitoring module to couple an associated back end module with a storage region on the common storage.

Communications are made asynchronously among the respective modules 2-5 and 7. In this embodiment, a cue-based asynchronous communication is performed. Two cues are provided for giving a priority to a communication, and consists of a normally used cue, and a special cue with a higher priority.

The active server group (8) represents a set of servers which are currently involved in data processing among a plurality of database servers, while the pool server group (9) represents a set of spare servers which are not currently involved in data processing, but are used when the overall system is heavily loaded. The pool server group can be shared among a plurality of shared-nothing database management systems. This approach is effective in increasing the availability ratio of the servers.

[Configuration of Back End Module when One Data Region is Allocated to Each Back End Module]

Figure 3:
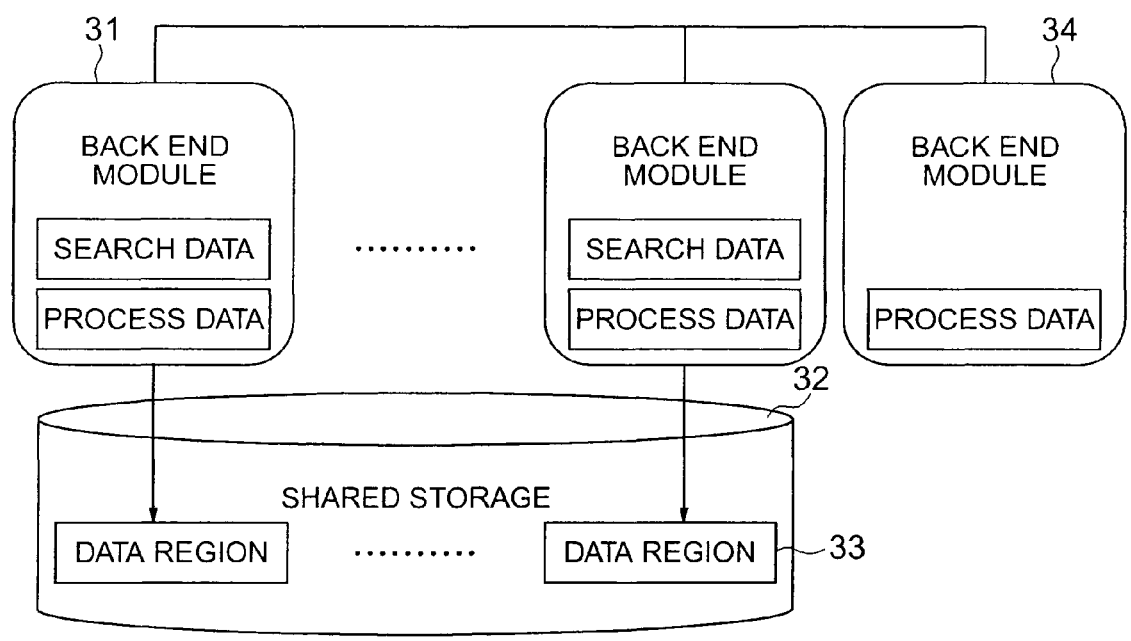
FIG. 3 is a block diagram illustrating the configuration of back end modules when one data region is allocated to each back end module in the shared-nothing database management system of the foregoing embodiment.

FIG. 3 illustrates the configuration of the back end modules when one data region is allocated to each back end module. A back end module (31) is coupled to one data region (33) on a common storage (32). Assume in the illustrated configuration that there is a back end module (34) which is not allocated to a data region. The back end module (31) is allocated a common data region on the common storage by the mapping module. Each back end module stores data to be processed on a data region allocated thereto and makes a search on that data region. The back end module also performs data processing such as sort and merge. Such processing may be performed while a plurality of back end modules communicate data with one another.

The data region (33) mainly stores mutually disjointed subsets of a database. The data region (33) also stores intermediate results of data processing, logs of data manipulations, and the like.

The back end module (34), which does not have a data region, does not search data, but is set exclusively for manipulations which impose a high load on the CPU, such as sort and merge. Data under manipulation is delegated to this back end module from another back end module through a network. The back end module, which does not have a data region, only provides a CPU resource to the active server group. On the other hand, each of the normal back end modules indicated by 31 provides both the CPU resource and storage I/O resource.

<Description on Operation when One Data Region is Allocated to Each Back End Module>

[Addition of Server]

Figure 4:
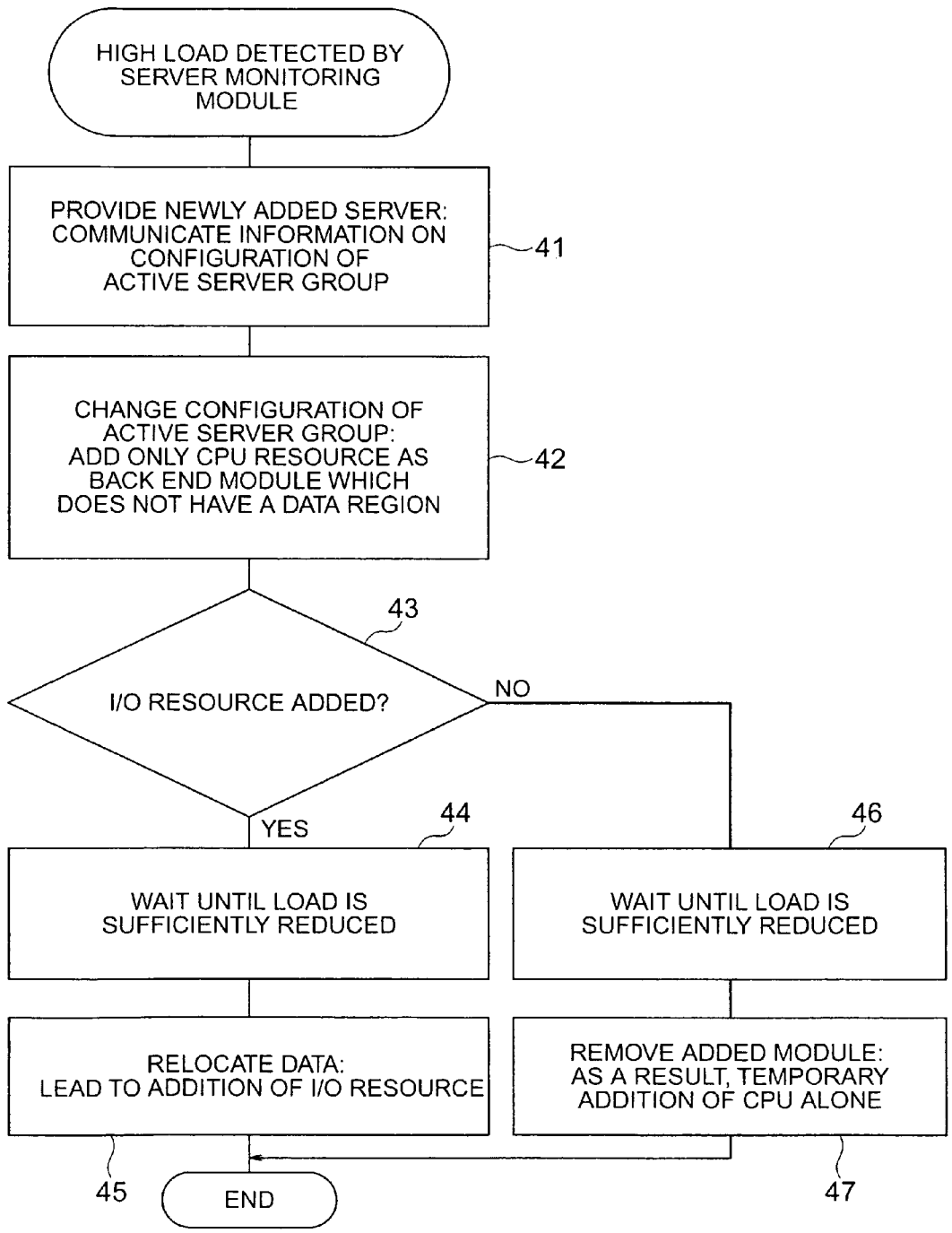
FIG. 4 is a flow chart illustrating a server addition process in the shared-nothing database management system of the foregoing embodiment.

As the server monitoring module detects a high load, a server addition process is started, causing the scheduler module (4) to create a processing flow illustrated in FIG. 4.

In the illustrated processing flow, a newly added server is prepared (41). Here, a suitable server is selected from the pool server group, and information on the configuration of the active server group is communicated.

Next, the prepared server is added from the pool server group to the current server group (42). Here, since the server is added as the back end module (34) which does not have a data region, the addition of the server is not associated with a movement of data. Consequently, the server can be added significantly rapidly as compared with the conventional approach when it is used for the same purpose.

The active server group is less loaded as a result of the addition of the back end module which does not have a data region at 42. It is determined from a rate at which the load is reduced and past statistical information, whether a high load detected this time is temporary or implies a lack of resources for the active server group over a long term (43).

If the detected high load implies a lack of resources for the active server group, a data region is preferably allocated to the back end module, added at 42, which does not have a data region, to add a storage I/O resource as well. However, as mentioned above, the data relocation is a high load operation. Therefore, the data allocation is awaited until the load on the active server group is sufficiently reduced (44). Then, the data is allocated after the load has been reduced (45).

On the other hand, if it is determined at 43 that the high load on the active server group is temporary, a server on which the currently added back end module, which does not have a data region, is returned to the pool server group. In this event, after waiting until the load is sufficiently reduced (46), the back end module which does not have a data region, added at 42, is removed from the active server group, and returned to the pool server group (47). This operation reduces the total number of pooled servers to increase the actual availability ratio of the servers when the pool server group is shared by a plurality of database management system.

It should be noted that when the configuration of the active server group is changed (42), it is necessary to ensure the ACID characteristic of transaction. The database management system according to this embodiment waits for the completion of a currently executed transaction without starting a new transaction, and subsequently changes the configuration while establishing the synchronization among all back end modules to ensure the ACID characteristic.

[Removal of Server]

Figure 5:
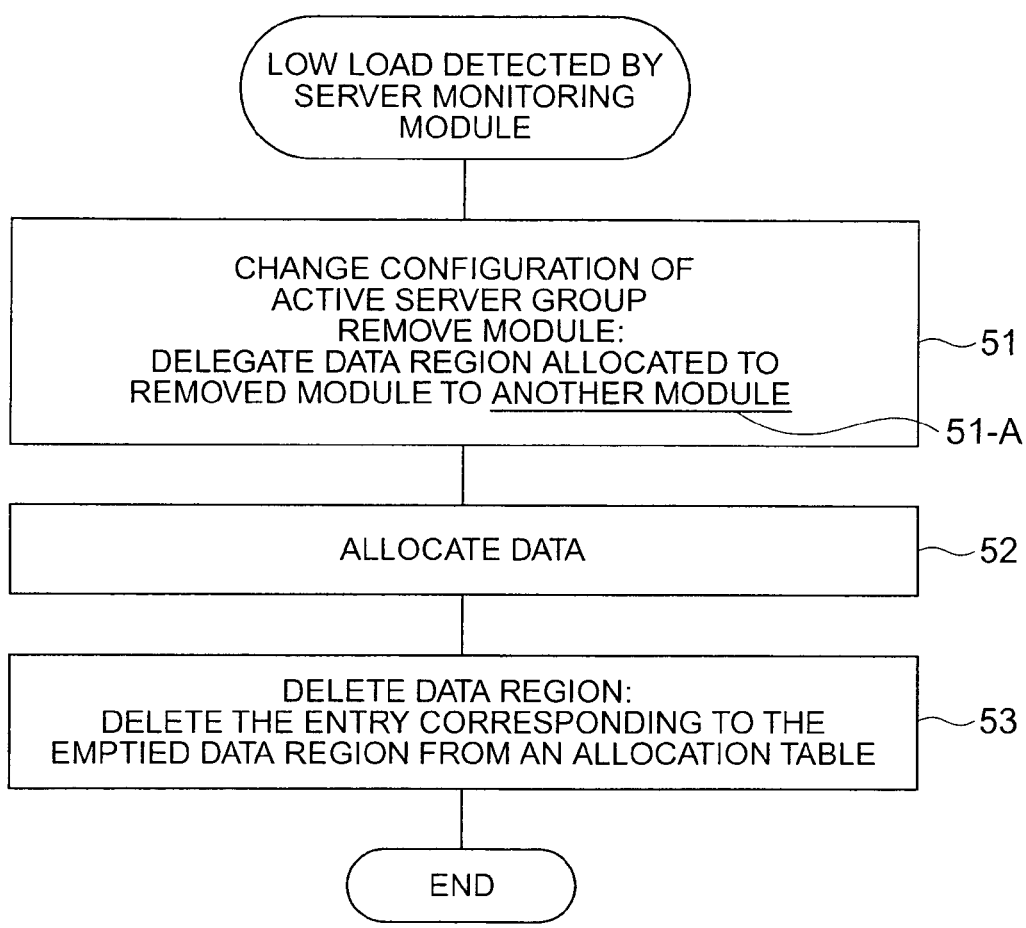
FIG. 5 is a flow chart illustrating a server removal process in the shared-nothing database management system of the foregoing embodiment.

As the server monitoring module detects a low load, a server removal process is started, causing the scheduler module (4) to create a processing flow illustrated in FIG. 5.

In the illustrated processing flow, the configuration is changed for the active server group (51). Here, an arbitrary database server is removed from the active server group, together with a back end module which has been run on the server, and an associated data region is allocated to another back end module (51-A). This operation may cause an unbalanced data distribution. Also, the removed database server is returned to the pool server group for increasing the availability ratio of the server. Next, the data relocation is performed (52). The data relocation at this step is intended to empty the data region allocated to the other back end module (51-A) at 51. This operation can substantially balance the amount of data allocated to each servers in the active server group. It should be noted that the processing flow illustrated in FIG. 5 is executed when the active server group is lightly loaded, so that no problem will arise from an increased load associated with the data relocation. After the data relocation, the data region emptied at 52 is completely deleted (53). Namely, the entry corresponding to the emptied data region on an allocation table is deleted.

[Configuration of Back End Module Using Data Region Subdivided on Common Storage]

Figure 6:
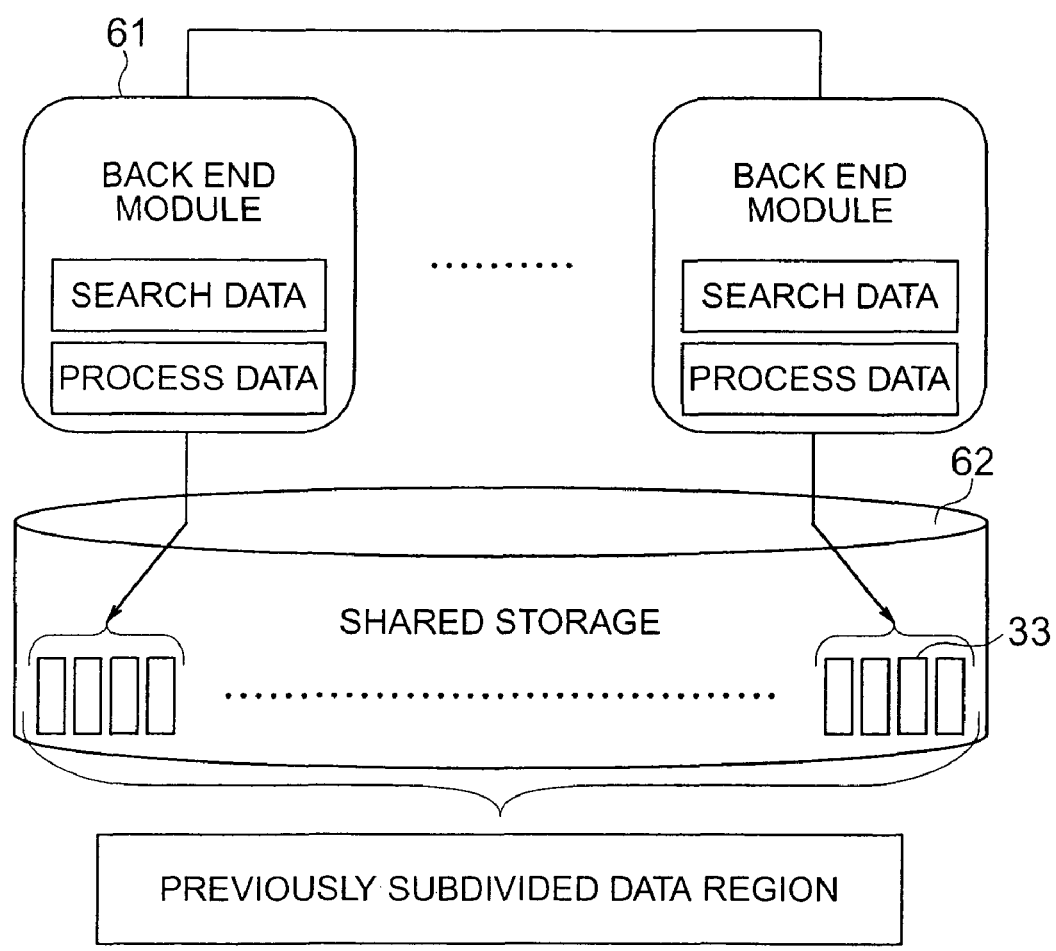
FIG. 6 is a block diagram illustrating the configuration of the back end module using subdivided data regions on a common storage according to another embodiment of the present invention.

FIG. 6 illustrates the configuration of the back end modules according to another embodiment of the present invention. While FIG. 6 only illustrates the relationship between each back end module and an associated region within the common storage, the database management system itself has similar components to those in the foregoing embodiment illustrated in FIG. 1, so that such components are omitted in the figure. In this embodiment, a data region 63 in a common storage 62 is not divided corresponding to the back end modules responsible for searching and processing of data stored therein, but is subdivided into smaller units. The subdivision is based, for example, on a hash division method which uses a hash value of a region identifier. Note, however, that the allocation of a data region to each back end module is not directly determined by the hash value, but is determined with reference to a hash value/module ID correspondence table which records and manages the correspondence relationship between the hash values and associated back end modules. In this configuration, a change in allocation of data region, which is required for additionally providing or removing a back end module, can be accomplished only by updating the hash value/module ID correspondence table. Since this change in allocation is not associated with an actual movement of data, it can be completed instantaneously. Consequently, in the event of addition or removal of a back end module, it is possible to further avoid a degradation in essential access processing performance of the database management system than the aforementioned embodiment.

FIG. 7 shows an example of the above-mentioned hash value/module ID correspondence table which is intended to permit the front end module to transfer a query to an appropriate back end module in the event of a change in a back end module to which a data region belongs. A back end module ID 73 is set corresponding to each hash value 72 of an identifier indicative of a data region. The setting may be made such that a total amount of data in data regions served between the back end modules or the frequencies of data accesses to the data regions should be distributed as uniform as possible. This hash value/module ID correspondence table is managed by the mapping module (see FIG. 1). The front end module, upon making a schedule, queries the mapping module to select appropriate back end modules.

[Description on Operation when Using Data Region Subdivided on Common Storage]
[Addition of Server]

Figure 8:
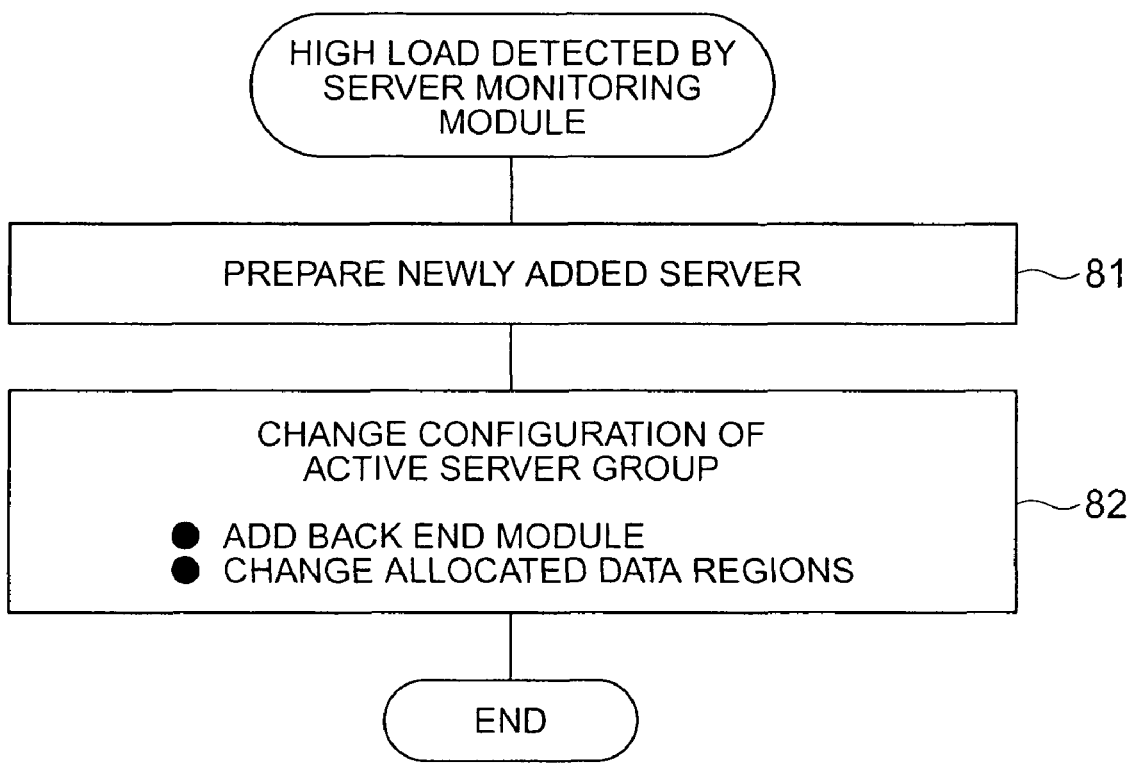
FIG. 8 is a flow chart illustrating a server addition process in the shared-nothing database management system of the foregoing embodiment.

As the server monitoring module detects a high load, a server addition process is started, causing the scheduler module (4) to create a processing flow illustrated in FIG. 8.

In the illustrated processing flow, a newly added server is first prepared (81). Like step 41, a suitable server is selected from the pool server group, and information on the configuration of the active server group is communicated. Next, the active server group is changed in configuration (82). Here, the server prepared at 81 is added, and a back end module is added. Further, for balancing the amounts of data allocated to all back end modules, allocated data regions are changed. As mentioned above, the allocated data regions are changed instantaneously.

[Removal of Server]

Figure 9:
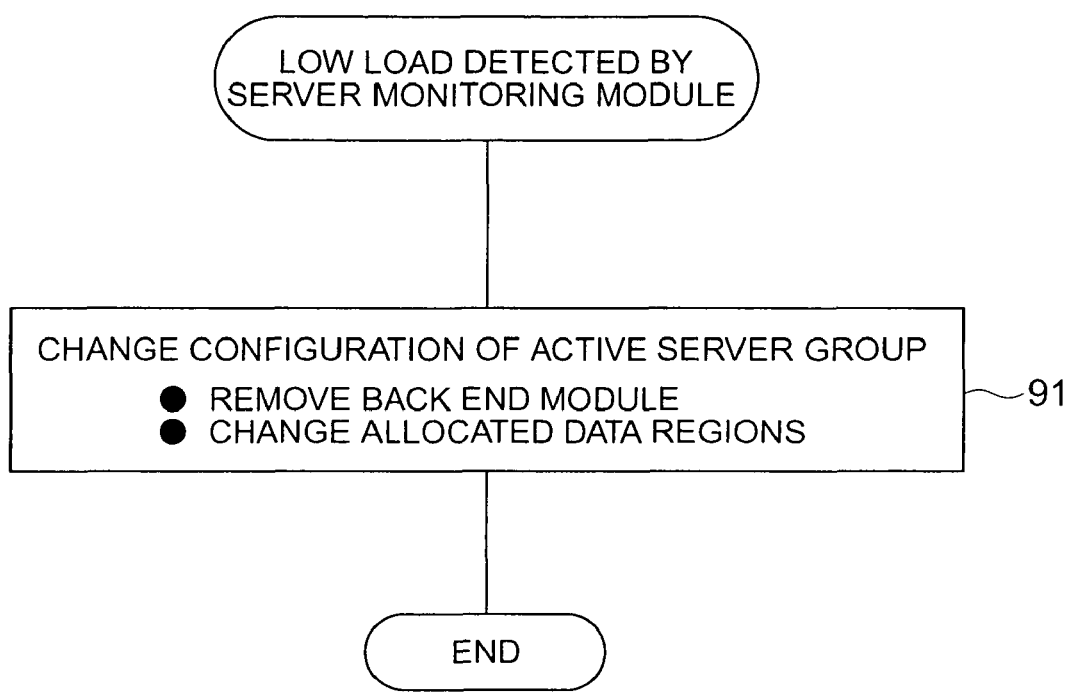
FIG. 9 is a flow chart illustrating a server removal process in the shared-nothing database management system of the foregoing embodiment.

As the server monitoring module detects a low load, a server removal process is started, causing the scheduler module (4) to create a processing flow illustrated in FIG. 9.

In the illustrated processing flow, the active server group is changed in configuration (91). Here, a suitable back end module is removed from the active server group and returned to the pool server group. Further, for balancing the amounts of data allocated to all the back end modules, the data regions allocated thereto are changed as appropriate. As mentioned above, the allocated data regions are changed instantaneously.

<Description of Operation when Virtual Layer is Used on Common Storage>

Figure 10:
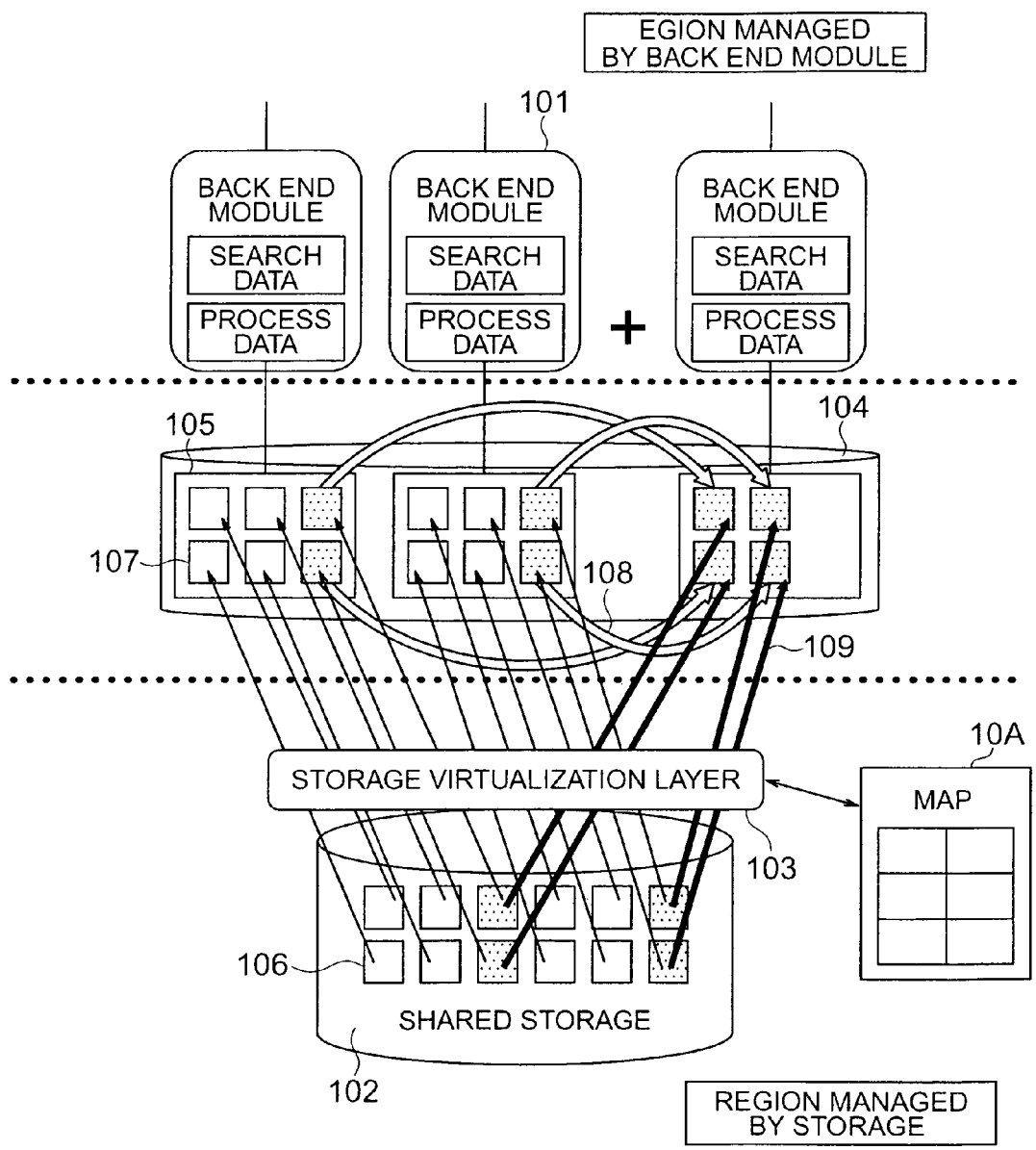
FIG. 10 is a block diagram illustrating the configuration of a shared-nothing database management system according to a further embodiment of the present invention which employs a virtualization layer on a common storage.

FIG. 10 illustrates the configuration of an embodiment which employs a virtual volume that is virtualized by a storage virtualization layer (103) on the common storage. A plurality of back end modules 101 are each provided for searching and processing data. The data search is directed to each virtual volume 105. The storage virtualization layer 103 provided in the common storage 102 associates a plurality of unit volumes 106 on the common storage with the virtual volumes 105. A map 10A is used for the association. Again, the hash division method is used for the data distribution among the back end modules. Specifically, data having the same hash value of the data identifier handled by the back end modules are regarded to belong to the same data group 107. Also, these data groups are placed in unit volumes 106, respectively, without overlapping. The aforementioned data group defines a minimum unit of data movement which occurs when a back end module is newly added or removed.

In this embodiment, the movement of data in units of data groups (108) can be replaced with a movement of corresponding unit volumes (106) within the database. After replacement, the unit volumes are passed to the storage virtualization layer (103) on the storage, and the storage virtualization layer rewrites the map (10A) so as to correspond to the movement (108) of data (109). In this way, the use of the storage virtualization layer (103) facilitates a data movement without physical movement.

<Description of Operation when Using Virtualization Layer on Storage Management Middleware>

Figure 11:
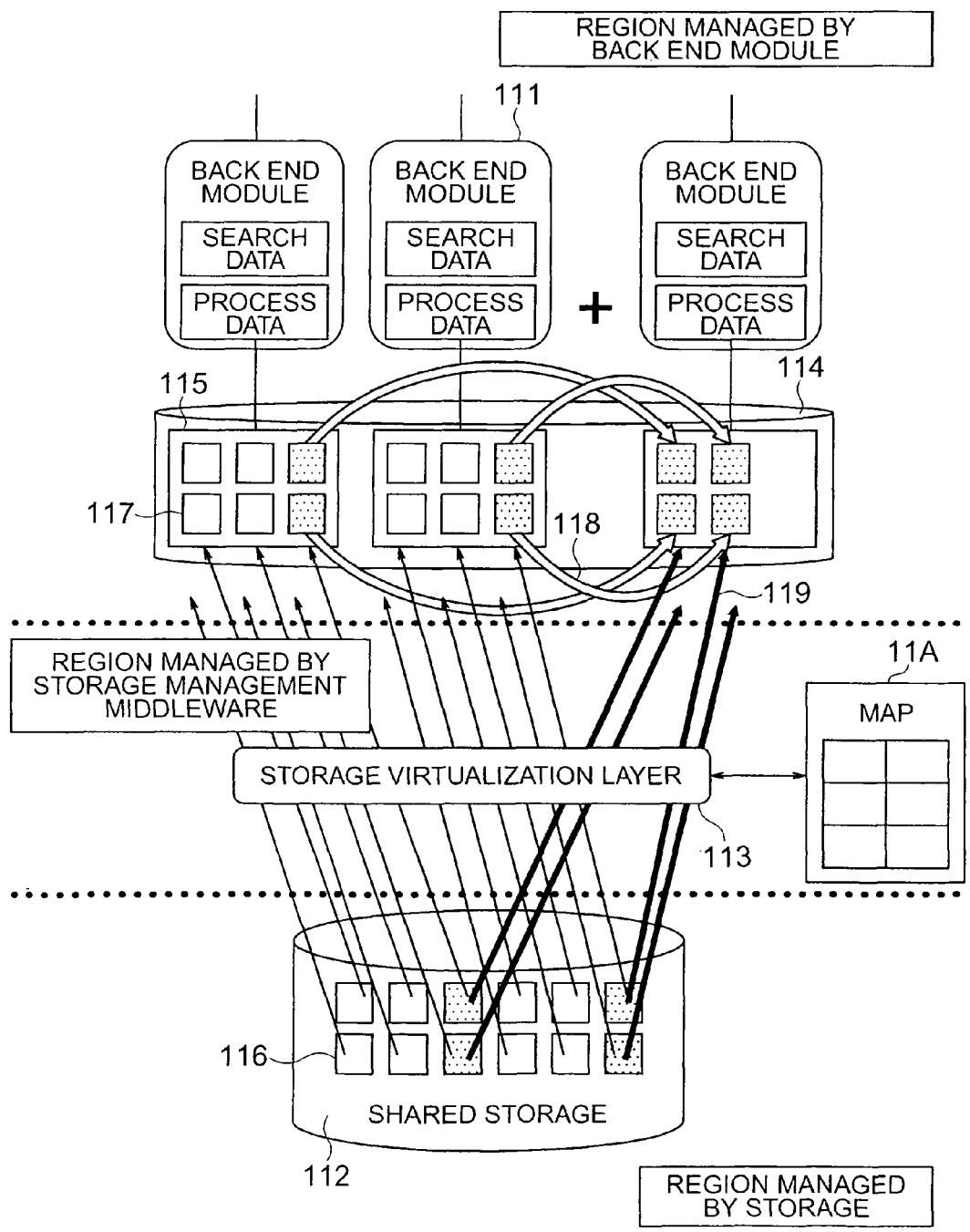
FIG. 11 is a block diagram illustrating the configuration of a shared-nothing database management system according to a further embodiment of the present invention which employs a virtualization layer on a store management middleware.

Referring to FIG. 11, back end modules 111 are associated with storages (115) virtualized by a storage virtualization layer (113) on a storage management middleware. The storage management middleware intervenes between the back end modules (111) and common storage (112) to manage the allocation of a data region for each back end module and to allocate the virtual volume (115). The allocation of a data region is implemented by an association of the virtual volume (115) with a unit volume (116) on the common storage (112). A map (11A) is used for the association. Again, the hash division method is used for the data distribution among the back end modules. Assume further that those having the same hash value belong to the same data group (117), and the data group is defined as a minimum unit of data movement. Also, the data groups are placed in the respective unit volumes (116) without overlapping.

Again, in this embodiment, a movement (118) of data in units of data groups can be replaced with a movement of corresponding unit volumes (116) within the database. After the replacement, the unit volumes are passed to the storage virtualization layer (113) on the storage management middleware, and the storage virtualization layer rewires the map (11A) to correspond to the data movement (118). In this way, with the use of the storage virtualization layer (113) on the storage management middleware, data can be moved without physical movement.

[Description of Operation when Using Virtualization Layer on Common File System]

Figure 12:
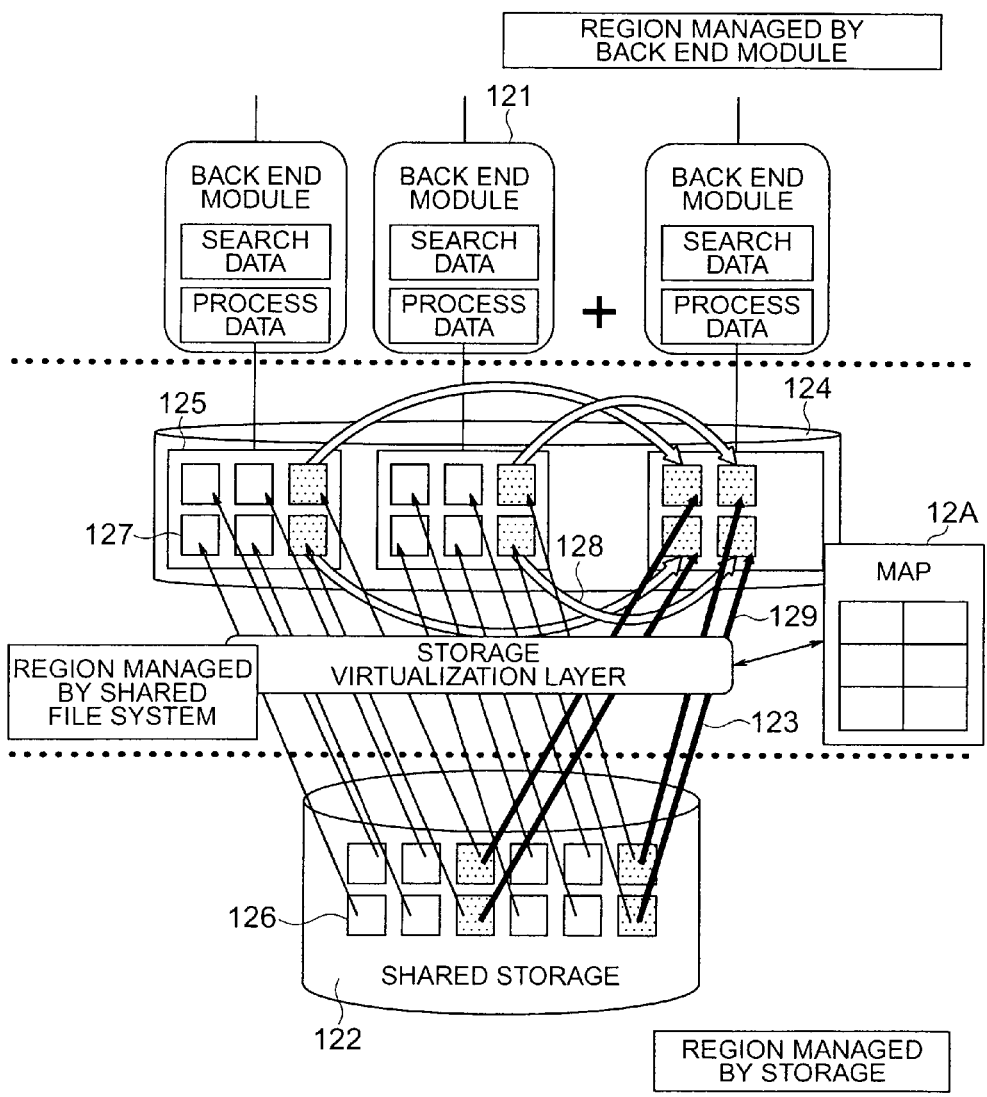
FIG. 12 is a block diagram illustrating the configuration of a shared-nothing database management system according to a further embodiment of the present invention which employs a virtualization layer on a common file system.

Referring next to FIG. 12, back end modules 121 are associated with a storage (124) virtualized by a storage virtualization layer (123) on the common file system. Here, a file system is assumed to be of a server-client type such as NFS. The file system intervenes between back end modules (121) and a common storage (122), and manages the allocation of a data region to each back end module to allocate a virtual volume (125) to each back end module. The allocation of a data region is implemented as an association of a virtual volume (125) with a unit volume (126) on the common storage (125). A map (12A) on the file server is used for the association. Again, the hash division method is used for distributing data among the back end modules. Assume further that those having the same hash value belong to the same data group (127), and the data group is defined as a minimum unit of data movement. Also, the data groups are placed in the respective unit volumes (126) without overlapping.

Again, in this embodiment, a movement (128) of data in units of data groups can be replaced with a movement of corresponding unit volumes (126) within the database. After the replacement, the unit volumes are passed to the storage virtualization layer (123) on the file system, and the storage virtualization layer rewires the map (12A) to correspond to the data movement (129). In this way, with the use of the storage virtualization layer (123) on the storage system, data can be moved without physical movement.

[Description on Operation when Using Virtualization Layer on Database Management System]

Referring to FIG. 13, Back end modules (131) are associated with virtual volumes (134) on a storage (134) which is virtualized by a storage virtualization layer (133) contained the database management system. The storage virtualization layer associates a plurality of unit volumes (136) on the common storage (132) with virtual volumes. A map (13A) on the map management module (13B) is used for the association. Again, the hash division method is used for the data distribution among the back end modules. Assume further that those having the same hash value belong to the same data group (137), and the data group is defined as a minimum unit of data movement. Also, the data groups are placed in the respective unit volumes (136) without overlapping.

Again, in this embodiment, a movement (138) of data in units of data groups can be replaced with a movement of corresponding unit volumes (136) within the database. After the replacement, the unit volumes are passed to the storage virtualization layer (133), and the storage virtualization layer rewires the map (13A) to correspond to the data movement (138). In this way, with the use of the storage virtualization layer (133) on the storage system, data can be moved without physical movement.

According to the present invention, the data allocation associated with the addition or removal of a database server resource in a shared-nothing database management system is shifted to a period in which the system is lightly loaded to avoid an increase in load associated with the addition or removal, so that the shared-nothing database management system can advantageously set a high threshold for a load upon determination as to whether a server is added or removed in accordance with a load on the database servers, improve the availability ratio of the servers, and reduce the number of pooled servers.

Further, with a combination of a storage virtualization layer, a movement of data can be replaced with an update of virtual volumes to accomplish a data relocation without physical data movement, thereby further improving the availability ratio of the server.

With the employment of an approach which previously subdivides a data area on a common disk, a CPU resource and a storage I/O resource can be added and removed without causing a delay. Also, because of no extra load such as data relocation involved in the addition and removal of resources, the shared-nothing database management system can advantageously set a high threshold for a load upon determination as to whether a server is added or removed in accordance with a load on the database servers, improve the availability ratio of the servers, and reduce the number of pooled servers, as is the case with the foregoing.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A system configuration changing method in a shared-nothing database management system which comprises a plurality of CPU resources, a storage, and a network for connecting said CPU resources and said storage, wherein each of said plurality of CPU resources runs a database search program stored in a computer-readable storage medium, and each database search program being executable by a processor and functioning as a backend module for processing data, said method comprising the steps of:
   allocating physically independent data regions of the storage to respective backend modules by registering mapping information between the data regions and the backend modules;
   determining whether or not a CPU resource is to be removed from the shared-nothing database management system by monitoring the states of the plurality of CPU resources;
   in response to the determination that the CPU resource is to be removed, delegating a data region of the storage previously allocated to a backend module corresponding to the CPU resource to be removed to another backend module; and
   relocating data on the delegated data region of the storage to respective backend modules except the backend module corresponding to the CPU resource to be removed by changing the mapping information.

2. A system configuration changing method in a shared-nothing database management system which comprises a plurality of CPU resources, a storage, and a network for connecting said CPU resources and said storage, wherein each of said plurality of CPU resources runs a database search program stored in a computer-readable storage medium, and each database search program being executable by a processor and functioning as a backend module for processing data, said method comprising the steps of:
   allocating physically independent data regions of the storage to respective backend modules by registering mapping information between the data regions and the backend modules;
   adding to said shared-nothing database management system a backend module exclusively for sorting and merging data without accessing a table in a database, wherein the added backend module sorts and merges data by receiving the data from other backend modules that have read the data from said storage;
   determining whether or not a storage I/O resource is to be added to said backend module exclusively for sorting and merging data; and
   in response to the determination that the storage I/O resource is to be added, relocating data to respective backend modules including said added backend module by changing the mapping information.

3. The system configuration changing method according to claim 2, wherein said step of adding a backend module for sorting and merging data comprises activating a program for sorting and merging data on a pooled backend module which is connected to the network and is not functioning as a CPU resource for said shared-nothing database management system.

4. The database management method in a database management system including a plurality of database servers, a plurality of backend modules running on respective of said plurality of servers for processing data of a database, a storage coupled to said plurality of database servers and having a plurality of data regions each of which stores data composing the database, the database management method comprising the steps of:
   previously allocating said plurality of data regions to respective backend modules so that each of said plurality of backend modules exclusively access at least two of said data regions,
   wherein each of said plurality of backend modules exclusively processes data stored in data regions allocated thereto;
   adding to said database management system a new backend module running on a server; and
   re-allocating said plurality of data regions to respective backend modules and said new backend module so that each of said plurality of backend modules and said new backend module exclusively access at least one of said data regions,
   wherein each of said plurality of backend modules and said new backend module exclusively processes data stored in said at least one of said data regions allocated thereto.

5. The database management method according to claim 4, wherein said adding step comprises a step of adding said new backend server to said database management system as a module exclusively for sorting and merging data without accessing data of said database.

6. The database management method according to claim 5, further comprising a step of:
   determining, prior to said re-allocating step, whether or not a storage I/O is to be added to said new backend module, wherein said step of re-allocating is executed in response to said step of determining.

7. The database management method according to claim 4, wherein said step of previously allocating comprises a step of registering mapping information that indicates a correspondence between each of said plurality of backend modules and said at least two of said plurality of data regions allocated thereto.

8. The database management method according to claim 7, wherein said step of re-allocating comprises a step of changing the mapping information.

9. A database management method in a database management system including a plurality of database servers, a plurality of backend modules running on respective said plurality of servers for processing data of a database, a storage coupled to said plurality of database servers and having a plurality of data regions, each of which stores data comprising the database, the database management method comprising the steps of:

previously allocating said plurality of data regions to respective backend modules so that each of said plurality of backend modules exclusively access at least one of said data regions, wherein each of said plurality of backend modules exclusively processes data stored in said at least one of said plurality of data regions allocated thereto;

removing a backend module among said plurality of backend modules; and re-allocating said plurality of data regions to respective backend modules other than removed backend module so that each of said plurality of backend modules other than the removed backend module exclusively access at least one of said data regions, wherein each of said plurality of backend modules other than said removed backend module exclusively processes data stored in said at least one of said data regions allocated thereto.

10. The database management method according to claim 9, wherein said step of previously allocating comprises a step of registering mapping information that indicates correspondence between each of said plurality of backend modules and said at least one of said plurality of data regions allocated thereto.

11. The database management method according to claim 10, wherein said step of re-allocating comprises a step of changing the mapping information.

* * * * *